United States Patent
Kong et al.

(10) Patent No.: US 10,199,951 B2
(45) Date of Patent: Feb. 5, 2019

(54) EFFICIENT POWER SUPPLY VOLTAGE REGULATION FOR SYNCHRONOUS RECTIFIER CONTROLLER

(71) Applicant: Dialog Semiconductor Inc., Campbell, CA (US)

(72) Inventors: Pengju Kong, Campbell, CA (US); Xiaye Wang, Campbell, CA (US); Wenbo Liang, Campbell, CA (US); Jianming Yao, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/943,996

(22) Filed: Apr. 3, 2018

(65) Prior Publication Data

US 2018/0226897 A1   Aug. 9, 2018

Related U.S. Application Data

(62) Division of application No. 15/247,823, filed on Aug. 25, 2016, now Pat. No. 9,935,559.

(51) Int. Cl.
*H02M 3/335*  (2006.01)
*H02M 1/08*   (2006.01)
*H02M 1/00*   (2006.01)

(52) U.S. Cl.
CPC ......... *H02M 3/33592* (2013.01); *H02M 1/08* (2013.01); *H02M 3/33553* (2013.01); *H02M 2001/0006* (2013.01); *H02M 2001/0009* (2013.01); *H02M 2001/0032* (2013.01); *H02M 2001/0054* (2013.01)

(58) Field of Classification Search
CPC .......... H02M 1/08; H02M 2001/0032; H02M 2001/0006; H02M 2001/0054; H02M 3/33553; H02M 3/33592; H02M 2001/0009
See application file for complete search history.

(56) References Cited

U.S. PATENT DOCUMENTS

| | | | | |
|---|---|---|---|---|
| 6,778,411 B2* | 8/2004 | Huang | | H02M 1/36 363/21.08 |
| 8,711,584 B2* | 4/2014 | Zhang | | H02M 3/335 363/21.13 |
| 8,964,421 B2 | 2/2015 | Kong et al. | | |
| 9,331,587 B2* | 5/2016 | Djenguerian | ..... | H02M 3/33523 |
| 2013/0235620 A1* | 9/2013 | Morris | | H02M 3/335 363/21.12 |
| 2014/0268915 A1* | 9/2014 | Kong | | H02M 3/33592 363/21.14 |
| 2016/0087541 A1* | 3/2016 | Xie | | H02M 3/33592 363/21.06 |
| 2016/0301314 A1* | 10/2016 | Polivka | | H02M 3/33507 |

* cited by examiner

*Primary Examiner* — Kyle J Moody
*Assistant Examiner* — Lakaisha Jackson
(74) *Attorney, Agent, or Firm* — Haynes and Boone, LLP (57) ABSTRACT

A flyback converter is provided with a synchronous rectifier (SR) controller including a pulse linear regulator (PLR) charging path and an LDO charging path. The SR controller is configured to monitor the switching period and/or duty cycle of a power switch in the flyback converter to select between the PLR and LDO charging paths.

10 Claims, 6 Drawing Sheets

EFFICIENT POWER SUPPLY VOLTAGE REGULATION FOR SYNCHRONOUS RECTIFIER CONTROLLER

CROSS-REFERENCE TO RELATED APPLICATIONS

This application is a divisional of U.S. application Ser. No. 15/247,823, filed Aug. 25, 2016.

TECHNICAL FIELD

This application relates to switching power converters, and more particularly to an efficient power source for a synchronous rectifier controller in a flyback converter.

BACKGROUND

A flyback switching power converter is commonly used to charge mobile devices as the converter's transformer provides safe isolation from AC household current. To provide a power pulse to the load, a primary-side controller cycles a power switch coupled to a primary winding in a transformer. A magnetizing current through the primary winding ramps up to a peak value whereupon the primary-side controller opens the power switch. While the primary-side switch was closed, a secondary-side controller opens a synchronous rectifier (SR) switch coupled to a secondary winding in the transformer. The secondary-side controller then closes the synchronous rectifier switch after the primary-side controller opens the power switch. The magnetic energy stored in the transformer from the magnetizing current causes the secondary winding current to pulse high and then ramp down to zero as the magnetic energy is depleted.

The secondary-side controller requires a power supply voltage VCC for its operation. During normal operation, the output voltage delivered to the load provides a convenient power source from which the power supply voltage VCC may be derived. For example, the secondary-side controller may include a low-dropout (LDO) voltage regulator to derive the power supply voltage VCC from the output voltage. But at low values for the output voltage, the secondary-side controller drives the synchronous rectifier switch at low efficiency, which leads to thermal heating issues. To alleviate the thermal stresses of driving the synchronous rectifier switch during periods of low output voltage, the present assignee developed an alternative power source for the secondary-side controller that is active during low output voltage operation as disclosed in U.S. Pat. No. 8,964,421, the contents of which are incorporated by reference in their entirety. In particular, the drain voltage on the synchronous rectifier switch drives another voltage regulator (e.g., another LDO) to produce the power supply voltage VCC during low output voltage operation. Since the drain voltage on the SR switch transistor pulses in each power switching cycle, the additional LDO is configured to regulate the power supply voltage for the SR controller using this pulsing drain voltage. In contrast, the output voltage does not pulse in this fashion such that a more conventional LDO topology may be used for the LDO that receives the output to regulate the SR controller power supply voltage. To distinguish this additional regulator from the output voltage power supply voltage path, it may be denoted herein as the pulse linear regulator (PLR). Although the thermal issues are then mitigated, the PLR circuit can only charge the VCC capacitor while the primary switch is on. It is during this on-time that the drain-to-source voltage for the synchronous rectifier switch pulses above the output voltage. But during periods of low load, the power switch cycles on only briefly during relatively long switching periods (low duty cycle). The average current delivered to the VCC capacitor by the PLR circuit is proportional to the power switching duty cycle such that as the power switching duty cycle drops during periods of low load, the PLR circuit cannot maintain the power supply voltage VCC. The secondary-side controller then stops working such that the synchronous rectifier switch remains open regardless of the power switch cycling. The output current to the load is then delivered through the body diode of the synchronous rectifier transistor switch. This is problematic for primary-only feedback control of the output voltage by the primary controller. In particular, the primary controller samples the reflected voltage on the primary winding (or on the auxiliary winding) at the transformer reset time during primary-only feedback control of the output voltage. But the conduction through the body diode of the closed synchronous rectifier switch due to insufficient power supply voltage produces a diode voltage drop that prevents the primary-side controller from properly sampling the output voltage.

Accordingly, there is a need in the art for improved power supply voltage regulation for a secondary-side controller in flyback converters with synchronous rectification.

SUMMARY

To alleviate the problems of thermal stress during periods of low output voltage while maintaining a sufficient power supply voltage, a synchronous rectifier (SR) controller is provided that monitors the power switch switching frequency and/or the duty cycle for the cycling of the power switch in a flyback converter. If the switching frequency or the duty cycle is sufficiently low, the SR controller derives its power supply voltage from the output voltage. Conversely, the SR controller derives its power supply voltage from a drain voltage for a synchronous rectifier switch transistor during periods of sufficiently high switching frequency and/or duty cycle for the power switch cycling. In some embodiments, the SR controller compares the output voltage to a threshold value. If the output voltage exceeds the threshold value, the SR controller derives its power supply voltage from the output voltage regardless of the duty cycle and/or switching period for the power switch cycling.

The resulting derivation of the power supply voltage for the SR controller is quite advantageous as the power supply voltage is maintained at sufficient levels to efficiently drive the synchronous rectifier switch transistor to avoid thermal issues and to keep the SR controller operational even if the duty cycle for the power switch cycling drops to low levels. These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for improved regulation of the power supply voltage for a synchronous rectifier (SR) controller in flyback converters with synchronous rectification, an SR controller is provided with two charging paths. A first charging path uses the output voltage as a power source to provide the power supply voltage. A second charging path uses a terminal voltage for the synchronous rectifier transistor switch as a power source to provide the power supply voltage. The selection of the first charging path or the second charging path depends upon the switching frequency and/or duty cycle for the cycling of a power switch transistor in the flyback converter. If the switching frequency or duty cycle is sufficiently high, the SR controller enables the second charging path to provide the power supply voltage. If the switching frequency and/or duty cycle is not sufficiently high, the SR controller enables the first charging path to provide the power supply voltage. In some embodiments, the SR controller selects the first charging path regardless of the switching frequency and/or duty cycle if the output voltage is sufficiently high.

Figure 1:
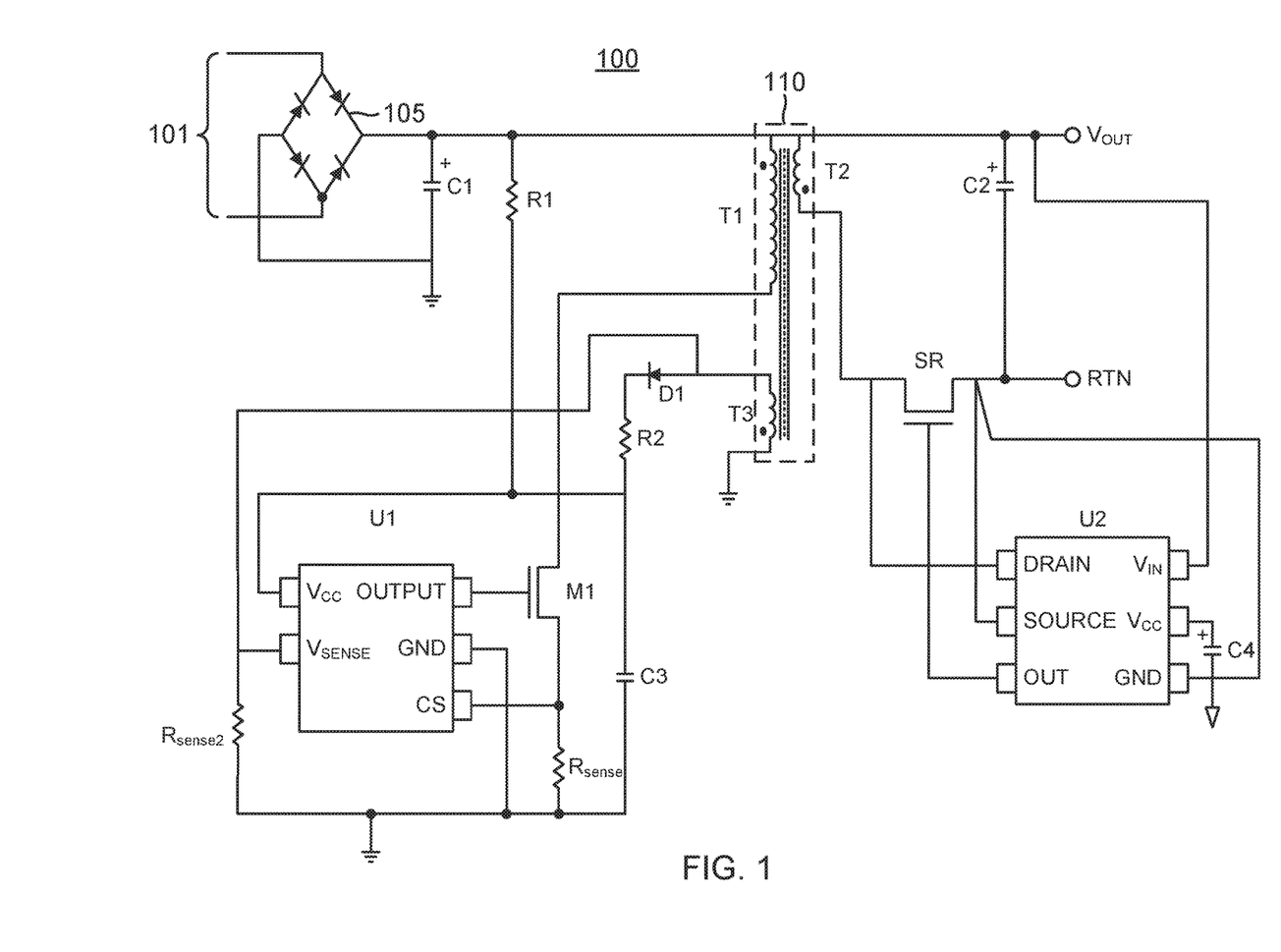
FIG. 1 is a circuit diagram of a flyback converter including a synchronous rectifier controller configured to efficiently regulate its power supply voltage in accordance with an aspect of the disclosure.

An example flyback converter 100 is shown in FIG. 1. A bridge rectifier 105 rectifies the AC voltage from an AC mains (not illustrated) to provide a rectified input voltage stored on an input capacitor C1. A primary-side controller (U1) controls the cycling of a power switch transistor M1 that couples between ground and a primary winding T1 of a transformer 110. In flyback converter 100, power switch transistor M1 comprises an NMOS transistor but it will be appreciated that a bipolar switching transistor may be used in alternative embodiments. Primary-side controller U1 includes an output pin or terminal through which it drives the gate of power switch transistor M1. In a switching cycle, primary-side controller U1 switches on power switch transistor M1 such that the rectified input voltage stored on the input capacitor C1 induces a magnetizing current to flow through the primary winding T1. This magnetizing current ramps up from zero during the switching cycle and is monitored by primary-side controller U1 through a current sensing (CS) terminal that senses the voltage on a current sensing resistor Rsense that couples between the source of power switch transistor M1 and ground. When the primary winding current reaches a desired maximum value in a switching cycle, primary-side controller U1 opens the power switch transistor M1.

While the power switch transistor M1 is closed, a synchronous rectifier (SR) switch transistor such an NMOS transistor is maintained open by an SR controller (U2). The SR controller includes a drain terminal for receiving the drain voltage for the SR switch transistor as well as a source terminal for receiving the source voltage for the SR switch transistor. To drive the SR switch transistor on, the SR controller charges its gate voltage through an output (OUT) terminal. The SR switch transistor couples between a terminal for a secondary winding T2 in transformer 110 and a return (RTN) terminal for a load. The load (not illustrated) also couples to an output terminal ($V_{OUT}$) that in turn couples to a remaining terminal for the secondary winding T2. The output voltage on the output terminal $V_{OUT}$ is stored by an output capacitor C2 that couples between the output terminal $V_{OUT}$ and the return terminal. The SR controller includes a $V_{IN}$ terminal that receives the output voltage. In addition, the SR controller includes a VCC terminal that couples to a terminal of a VCC capacitor C4 which has a remaining terminal coupled to a ground (GND) terminal for the SR controller.

During primary-only feedback control of the output voltage, the primary-side controller U1 senses a reflected voltage on an auxiliary winding T3 for transformer 110 through a $V_{SENSE}$ terminal. A storage capacitor C3 couples to the auxiliary winding T3 through a resistor R2 and a diode D1. The storage capacitor C3 stores a power supply voltage for the primary-side controller that it receives through a VCC terminal.

Figure 2:
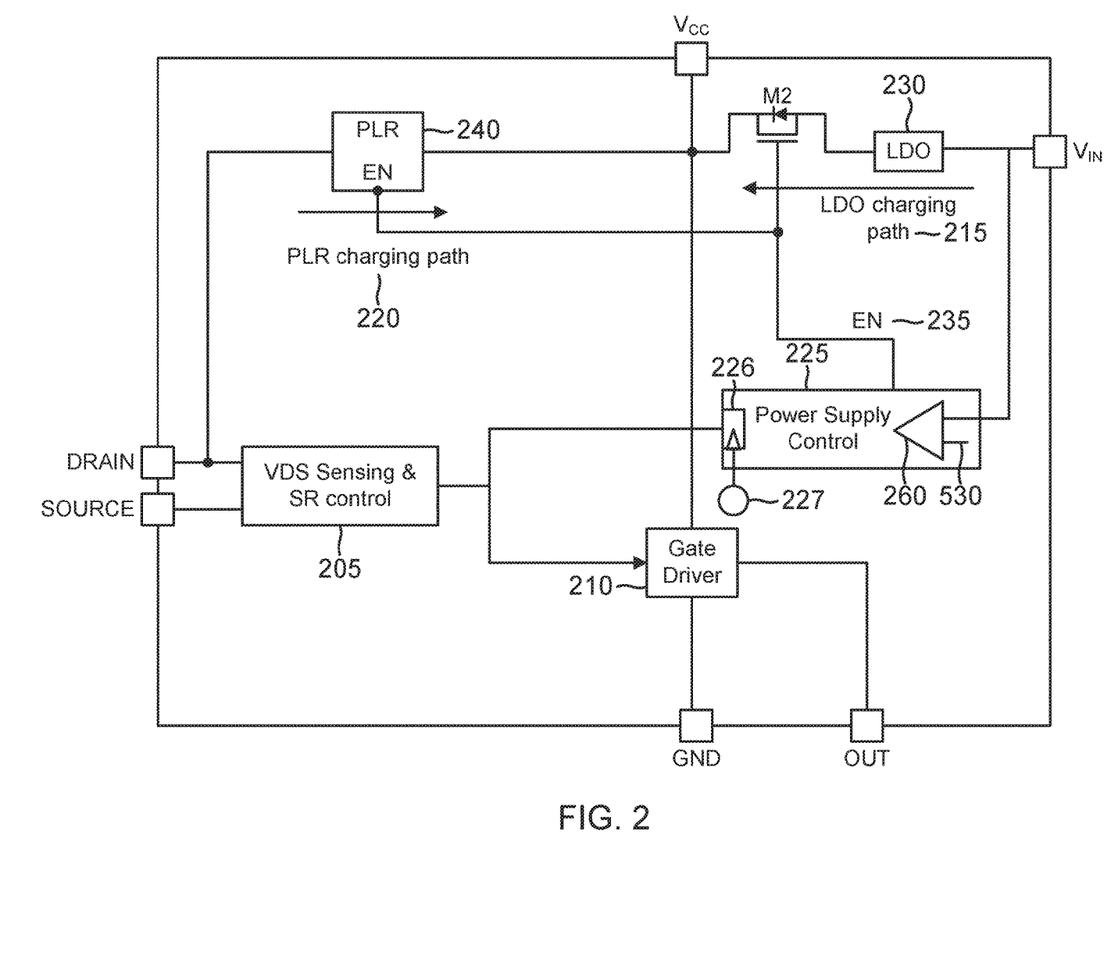
FIG. 2 is a block diagram of the synchronous rectifier controller of FIG. 1 in accordance with an aspect of the disclosure.

The SR controller is shown in more detail in FIG. 2. The drain and source voltages for the SR switch transistor (FIG. 1) are received through the drain and source terminals by a drain-to-source voltage (VDS) sensing and SR control circuit 205. VDS sensing and SR control circuit 205 comprises a state machine or digital logic configured to process VDS to effect synchronous rectification control of the SR switch transistor through a gate driver 210 that charges the gate voltage for the SR switch transistor through the OUT terminal. The gate driver 210 receives ground through the ground (GND) terminal. The ground connection to the remaining circuitry within SR controller is not shown for illustration clarity. The source and ground terminals may be combined in alternative embodiments.

To charge its power supply voltage (VCC) stored on VCC capacitor C4 (FIG. 1), the SR controller includes an LDO charging path 215 and a PLR charging path 220. A power supply control circuit 225 controls the activation of a selected one of these paths to regulate the power supply voltage based upon the operating conditions for the SR controller as discussed further herein. LDO charging path 215 includes an LDO 230 that couples between the $V_{IN}$ terminal and an LDO charging path transistor M2 such as an NMOS transistor. Power supply control circuit 225 (e.g., a plurality of logic gates configured to form a state machine) controls the on and off state of LDO charging path transistor M2 with an enable signal (EN) 235. Should power supply control circuit 225 assert the enable signal, LDO charging path transistor M2 switches on such that LDO 230 may use the output voltage received on the $V_{IN}$ terminal to charge the power supply voltage through LDO charging path 215 with a minimum voltage drop across LDO charging path transistor M2. Note that switching off LDO charging path transistor M2 does not shut down LDO 230 but instead blocks the reverse current from the VCC terminal to the $V_{IN}$ terminal should VCC be greater than the output voltage.

PLR charging path 220 comprises a PLR 240 that couples between the drain voltage terminal and the VCC terminal. PLR 240 is deactivated by the enable signal assertion. Conversely, if power supply control circuit 225 de-asserts the enable signal, PLR 240 functions to charge the power supply voltage supplied to the VCC terminal as powered through the pulsing of the drain voltage for the SR switch transistor (FIG. 1). PLR 240 is shown in more detail in FIG. 3. A cathode of a diode D2 is coupled to the drain terminal of an NMOS switch transistor M4. The cathode of the diode D2 is also coupled to a resistor R3. An anode of a Zener diode Z1 is coupled to ground (GND). The cathode of the Zener diode Z1 is coupled to both the resistor R3 and the gate terminal of transistor M4 at a node 303. The enable signal (EN) drives a gate of an NMOS grounding transistor M3 that couples between node 303 and ground. When the enable signal is asserted, the gate of transistor M4 is thus grounded to prevent operation of PLR 240.

When power switch M1 is on (FIG. 1) and the SR switch transistor disabled while the enable signal is de-asserted, the drain voltage of the SR switch transistor pulses high. Diode D2 rectifies the pulsing drain voltage and current flows through resistor R3. The Zener diode Z1 clamps a voltage (e.g., 1.5V) at node 303 thereby turning on switch transistor M4. The current flowing through switch transistor M4 is stored as energy in the VCC capacitor C4 (FIG. 2). When switch transistor M4 is switched off, the energy stored in the VCC capacitor C4 is released to charge the power supply voltage. The switch transistor M4 is turned off when the power supply voltage is greater than the difference of the breakdown voltage of the Zener diode Z1 and its threshold voltage. The switch transistor M4 may also be turned off when the drain voltage for the SR switch transistor is less than VCC voltage.

Power supply control circuit 225 thus controls whether PLR charging path 220 is active by de-asserting the enable signal, which also de-activates LDO charging path 215. Conversely, power supply control circuit 225 activates LDO charging path 215 and de-activates PLR charging path 220 by asserting the enable signal. With regard to this control, note that it was conventional for power supply control circuit 225 to effect this control by comparing the output voltage to a threshold value. If the output voltage was sufficiently high as determined through this comparison, LDO charging path 215 was activated and PLR charging path 220 de-activated. Conversely, if the output voltage was less than the threshold voltage, PLR charging path 220 was activated and LDO charging path 215 de-activated. But this conventional control leads to the power supply voltage VCC becoming depleted during low load states. In particular, the duty cycle for the power switch transistor M1 becomes low during the low load state but the pulsing of the drain voltage on the SR switch only occurs while the power switch transistor M1 is on. This pulse of power must then be sufficient to power the SR controller during the subsequent relatively long off-time for the power switch transistor M1. As this off-time is extended during low load states, the SR controller may then switch off due to insufficient charging of its power supply voltage VCC. The SR switch transistor can then conduct only through its body diode such that primary-only feedback techniques for sensing the output voltage are inaccurate due to the voltage drop across the body diode for the SR switch transistor at the transformer reset time.

To provide a sufficient power supply voltage for the SR controller during low load states, power supply control circuit 225 is configured to compare the duty cycle or the switching period for the power switch transistor M1 to a threshold value. Note that the switching period and the switching frequency are inversely proportional to each other so it is equivalent for power supply control circuit 225 to also monitor the switching frequency for the power switch transistor M1 as compared to its switching period. In some embodiments, power supply control circuit 225 merely uses the monitoring of the duty cycle (or just the switching period) to control the activation and de-activation of the LDO and PLR charging paths without using the output voltage. Such control eliminates the need for a comparator to compare the output voltage to a threshold value. In other embodiments, power supply control circuit 225 also uses the output voltage to control the activation and de-activation of the LDO and PLR charging paths.

Figure 3:
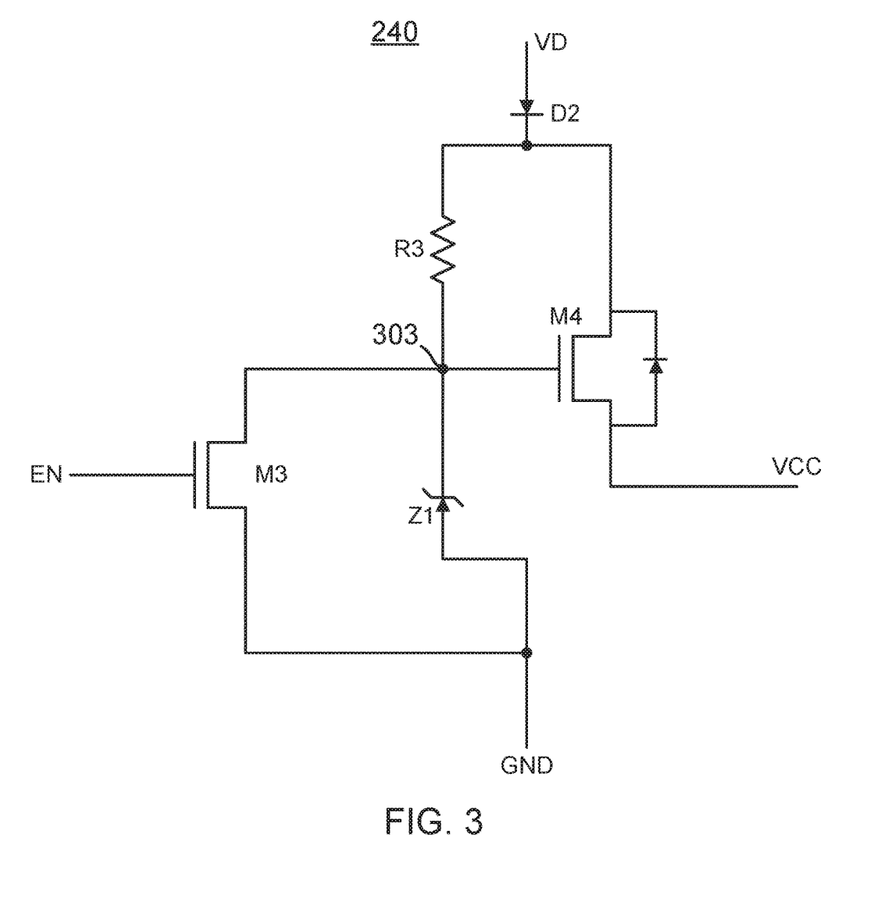
FIG. 3 is a circuit diagram of the pulse linear regulator in the synchronous rectifier controller of FIG. 2 in accordance with an aspect of the disclosure.
Figure 4:
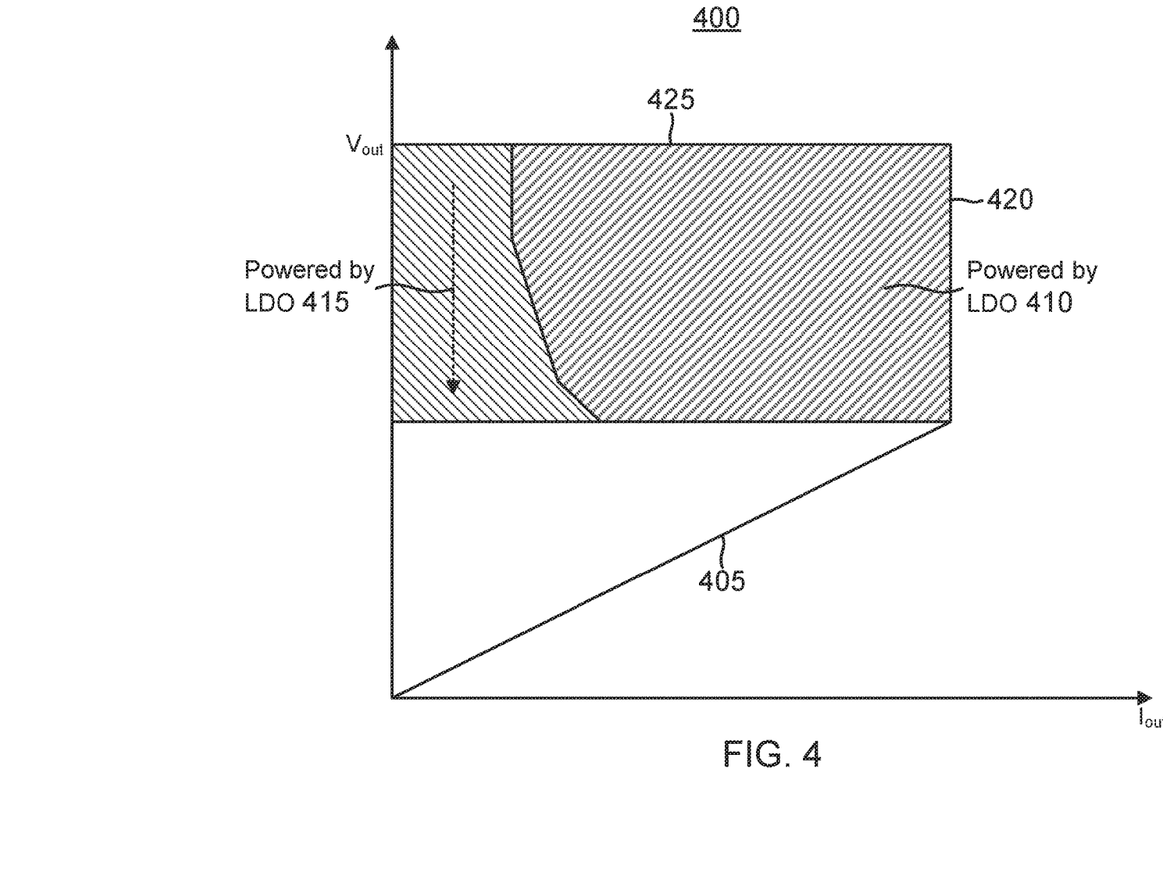
FIG. 4 is a plot of the output voltage and current for a flyback converter in which the synchronous rectifier controller does not use the output voltage to select between the PLR and LDO charging paths in accordance with an aspect of the disclosure.

The control of the activation and de-activation of the LDO and PLR charging paths will first be described for embodiments that do not use the output voltage as shown in FIG. 4 for an output voltage and output current curve 400. At power-up, the duty cycle of the power switching is relatively high such that the output voltage and output current follow a relatively linear increase as shown by line 405 during which PLR charging path 220 is active (FIG. 3). Although LDO charging path transistor M2 is off at this time, LDO 230 is still enabled so that it can also provide charging to VCC (should VCC be much lower than the output voltage) through the body diode of LDO charging path transistor M2. This body diode will introduce a diode voltage drop (e.g., 0.7 V) while conducting. Once the output current reaches an allowable maximum, a constant-current mode of operation for flyback converter 100 (FIG. 1) is reached as shown by line 420. This constant-current mode of operation is maintained until the output load drops such that flyback converter 100 enters a constant-voltage mode of operation as shown by line 425. Depending upon the load, the constant-voltage and constant-current modes of operation will occupy a high-duty-cycle space 410 in which the duty cycle for the power switch cycling is still relatively high. Thus, PLR charging path 220 is selected while the flyback converter's output current and output voltage are within high-duty-cycle space 410. If, however, the duty cycle drops further, the flyback converter's output current and output voltage are within a low-duty-cycle space 415. Power supply control circuit 225 (FIG. 3) would then select LDO charging path 215 to charge its power supply voltage while flyback converter 100 operates within low-duty-cycle space 415.

Figure 5:
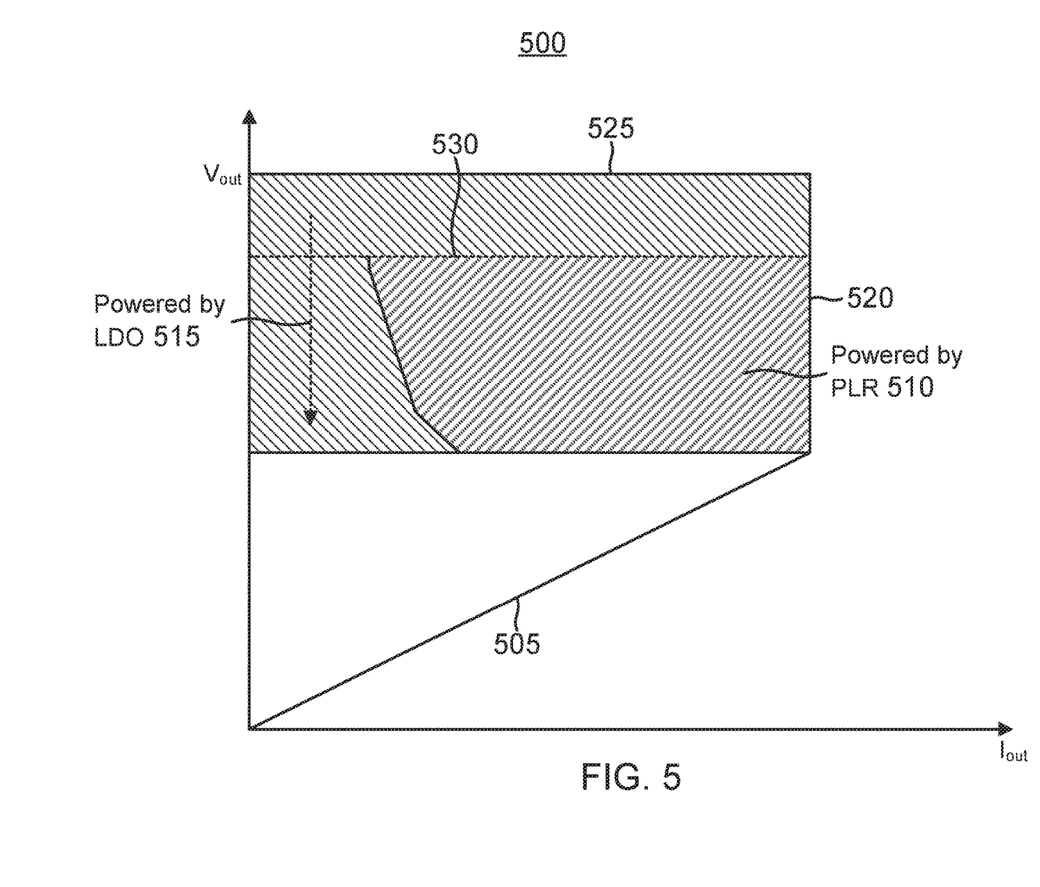
FIG. 5 is a plot of the output voltage and current for a flyback converter in which the synchronous rectifier controller uses the output voltage to select between the PLR and LDO charging paths in accordance with an aspect of the disclosure.

Should the output voltage also be considered with regard to the selection of the LDO and PLR charging paths, an output current and output voltage curve 500 may be used as shown in FIG. 5. At startup, PLR charging path 220 is selected and the output current and output voltage increase as shown by line 505 until a maximum output current is reached. With the output current at its maximum, a constant-current mode of operation begins as shown by line 520. If the duty cycle is still sufficient but the output voltage exceeds an LDO minimum voltage 530, LDO charging path 215 becomes active. This use of LDO charging path 215 remains active as the load is dropped and a constant voltage mode of operation begins as shown by line 525. So long as the output voltage is above LDO minimum voltage 530, LDO charging path 215 remains active. But as the output voltage drops below LDO minimum voltage 530 at sufficiently high values of the power switching duty cycle, PLR charging path 220 is selected instead of LDO charging path 215. Flyback converter 100 then operates in a low-output voltage but sufficiently-high duty cycle space 510 in which PLR charging path 220 is active. But if the duty cycle drops too low, flyback converter 100 operates in an LDO space 515 regardless of the output voltage dropping below LDO minimum voltage 530.

The selection (which may also be denoted as an activation) of the PLR and LDO charging paths is mutually exclusive such as through the use of the enable signal and may be performed according to either of curves 400 and 500. The resulting control by power supply control circuit 225 may be implemented using either digital or analog circuits. A digital implementation is convenient as the VDS sensing and SR control circuit 205 must already monitor the switching period for power switch M1 so it can open and close the SR switch transistor accordingly. The control signal from VDS sensing and SR control circuit 205 for switching on the SR switch transistor through gate driver 210 may thus also be received by power supply control circuit 225 to activate a counter (or counters) 226. Counter 226 counts during each on time for the SR switch and each off time for the SR switch responsive to cycles of an SR controller clock 227. With regard to this counting, a comparator may be used to determine when drain-to-source voltage (VDS) for the SR switch transistor is higher than the output voltage to determine the on-time for the SR switch transistor. The sum of the on and off times and the cycle dead time for a given switching cycle provide the switching period. In a digital implementation, power supply control circuit 225 may thus readily determine the duty cycle and/or switching period (or frequency) for power switch M1 using counter 226. In embodiments in which the output voltage is also used to select for the LDO and PLR charging paths, power supply control circuit 225 may include a comparator 260 that compares the output voltage to the LDO minimum voltage 530. Should comparator 260 indicate that the output voltage exceeds LDO minimum voltage 530, power supply control circuit 225 asserts the enable signal regardless of any counts from counter 226.

Figure 6:
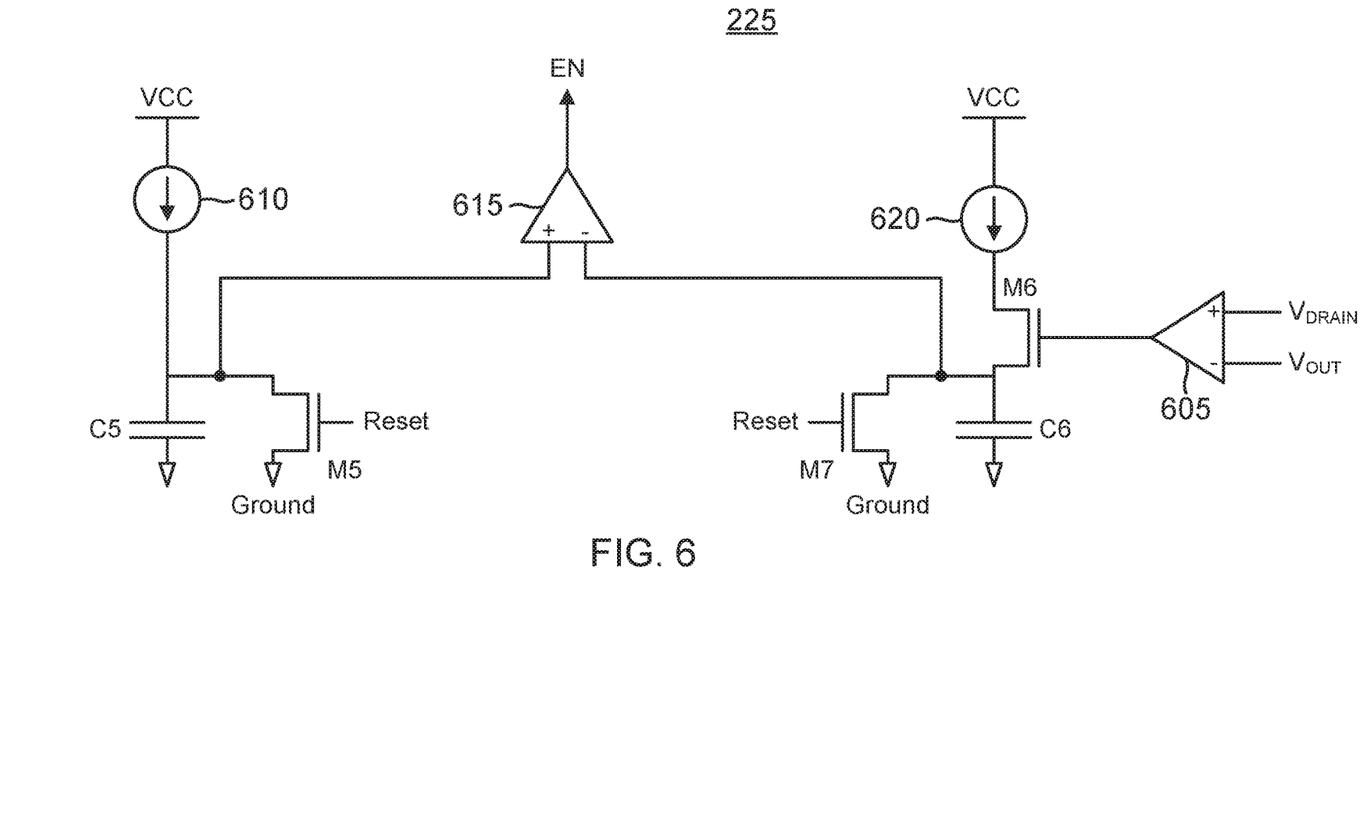
FIG. 6 is a circuit diagram of an analog implementation for a power supply control circuit in accordance with an aspect of the disclosure.

An analog implementation for power supply control circuit 225 may be as shown in FIG. 6. A current source 610 charges a capacitor C5 that is reset by a reset signal such as derived from the rising edge of the driver output from gate driver 210 (FIG. 2). The reset signal drives the gate of an NMOS reset transistor M5 that couples between ground and the current source 610. Capacitor C5 will thus be discharged by the assertion of the reset signal. Since the rising edge of the driver output (alternatively the following edge may also be used) from one cycle to another is proportional to the switching period for the current power switching cycle, capacitor C5 will thus be charged proportionally to the switching period. Another current source 620 charges a capacitor C6 whenever the SR switch drain voltage exceeds the output voltage. In particular, the SR switch drain voltage exceeds the output voltage during the on-time for the power switch. A comparator 605 compares the drain voltage and the output voltage and switches on an NMOS transistor M6 coupled between current source 620 and capacitor C6 to cause capacitor C6 to be charged during the on-time for the power switch transistor M1 (FIG. 1). Capacitor C6 may be reset by an NMOS reset transistor M7 controlled by the same reset signal as discussed with regard to reset transistor M5. Suppose that the duty cycle threshold is 10%. To test for such a duty cycle, a comparator 615 may compare the voltage stored on capacitor C5 to the voltage stored on capacitor C6 just prior to the reset time. For example, capacitors C5 and C6 may have the same capacitance whereas current source 620 may be ten times stronger than current source 610. A high output from comparator 615 would thus indicate that the duty cycle is less than the duty cycle threshold such that the enable signal would be asserted to select for LDO charging path 615. A sample and hold circuit (not illustrated) may be used to sample and hold the enable signal just prior to the reset signal assertion. Alternatively, a comparator may be used to compare the drain voltage for the SR switch transistor and the output voltage to determine the switching period for the power switch transistor M1.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A synchronous rectifier (SR) controller for a flyback converter, comprising:
   a drain terminal configured to couple to a drain of a synchronous rectifier switch transistor;
   a VCC terminal configured to couple to a VCC capacitor;
   an output voltage terminal configured to receive an output voltage of the flyback converter;
   a first voltage regulator coupled between the drain terminal and a VCC terminal,
   a second voltage regulator coupled between the output voltage terminal and the VCC terminal;
   a power supply control circuit configured to activate the first voltage regulator to regulate a power supply voltage for the SR controller responsive to a duty cycle for a power switch in the flyback converter exceeding a threshold value and to activate the second voltage regulator to regulate the power supply voltage responsive to the duty cycle being less than the threshold value.

2. The SR controller of claim 1, wherein the second voltage regulator is coupled to the VCC terminal through a charging path switch transistor, and wherein the power supply control circuit is further configured to open the charging path switch transistor while the first voltage regulator is activated and to close the charging path switch transistor while the second voltage regulator is activated.

3. The SR controller of claim 1, wherein the first voltage regulator and the second voltage regulator both comprise linear drop-out regulators.

4. The SR controller of claim 3, wherein the first voltage regulator comprises a pulse linear regulator (PLR) including a zener diode coupled in series with a resistor and a diode between the drain terminal and ground, and further including a switching transistor coupled in series between the diode and a storage capacitor, and wherein a node between the zener diode and the resistor is coupled to a gate of the switching transistor.

5. The SR controller of claim 4, further comprising a grounding transistor coupled between the gate of the switching transistor and ground, wherein the power supply control circuit is further configured to switch the grounding transistor on while the first voltage regulator is activated and to switch the grounding transistor off while the second voltage regulator is activated.

6. A synchronous rectifier (SR) controller for a flyback converter, comprising:
   a first voltage regulator coupled between a drain terminal for receiving a drain voltage of a synchronous rectifier switch transistor and a VCC terminal for coupling to a VCC storage capacitor, a second voltage regulator coupled between a output terminal for receiving an output voltage of the flyback converter and the VCC terminal;

a power supply control circuit configured to activate the first voltage regulator to regulate a power supply voltage for the SR controller responsive to a duty cycle for a power switch in the flyback converter exceeding a duty cycle threshold value while the output voltage is less than an output voltage threshold value and to activate the second voltage regulator to regulate the power supply voltage responsive to the duty cycle being less than the duty cycle threshold value or to the output voltage being greater than the output voltage threshold value.

7. The SR controller of claim 6, further comprising a comparator configured to compare the output voltage to the output voltage threshold value.

8. The SR controller of claim 6, further comprising at least one counter configured to count an on-time count during an on-time for a power switch in the flyback converter and to count a switching period count during a switching period for the power switch, and wherein the SR controller is configured to determine the duty cycle by dividing the on-time count by the switching period count.

9. The SR controller of claim 6, further comprising a gate driver for driving a gate of the synchronous rectifier switch transistor.

10. The SR controller of claim 6, wherein the first voltage regulator and the second voltage regulator both comprise linear drop-out regulators.

* * * * *